United States Patent [19]

Yamamoto et al.

[11] Patent Number: 4,835,754
[45] Date of Patent: May 30, 1989

[54] TRACKING CONTROL DEVICE OF AN OPTICAL PICK-UP

[75] Inventors: Kazutaka Yamamoto; Toshihiro Shigemori, both of Yokohama, Japan

[73] Assignee: Ricoh Company, Ltd., Tokyo, Japan

[21] Appl. No.: 123,055

[22] Filed: Nov. 19, 1987

[30] Foreign Application Priority Data

Nov. 21, 1986 [JP] Japan ............................ 61-278271

[51] Int. Cl.$^4$ .............................................. G11B 7/085
[52] U.S. Cl. ........................................ 369/32; 369/46
[58] Field of Search ..................... 369/44–46, 369/32, 33; 358/907; 250/201

[56] References Cited

U.S. PATENT DOCUMENTS

| | | | |
|---|---|---|---|
| 4,544,838 | 10/1985 | Musha et al. | 369/44 |
| 4,613,963 | 9/1986 | Hirano | 369/44 |
| 4,677,602 | 6/1987 | Okano et al. | 369/46 |
| 4,698,795 | 10/1987 | Yoshio | 369/44 |

Primary Examiner—Donald McElheny, Jr.
Attorney, Agent, or Firm—Cooper & Dunham

[57] ABSTRACT

A tracking control system for use in an optical pick-up of an optical disc recording and reproducing apparatus includes a pair of photoelectric elements for receiving light reflecting from an optical disk. A pair of light current outputs obtained from the photoelectric elements is processed to produce a differential signal. A low pass filter is provided as a phase delay compensation circuit for compensating the low frequency component of the differential signal. During a track jump mode, the differential signal is processed through the low pass filter whose output is added with a kick pulse to produce a drive signal for use in a tracking actuator. The input side of the low pass filter may be disconnected during a track jump mode, thereby causing the low pass filter to also serve as a holding circuit for holding the voltage of the differential signal immediately prior to track jump.

8 Claims, 6 Drawing Sheets

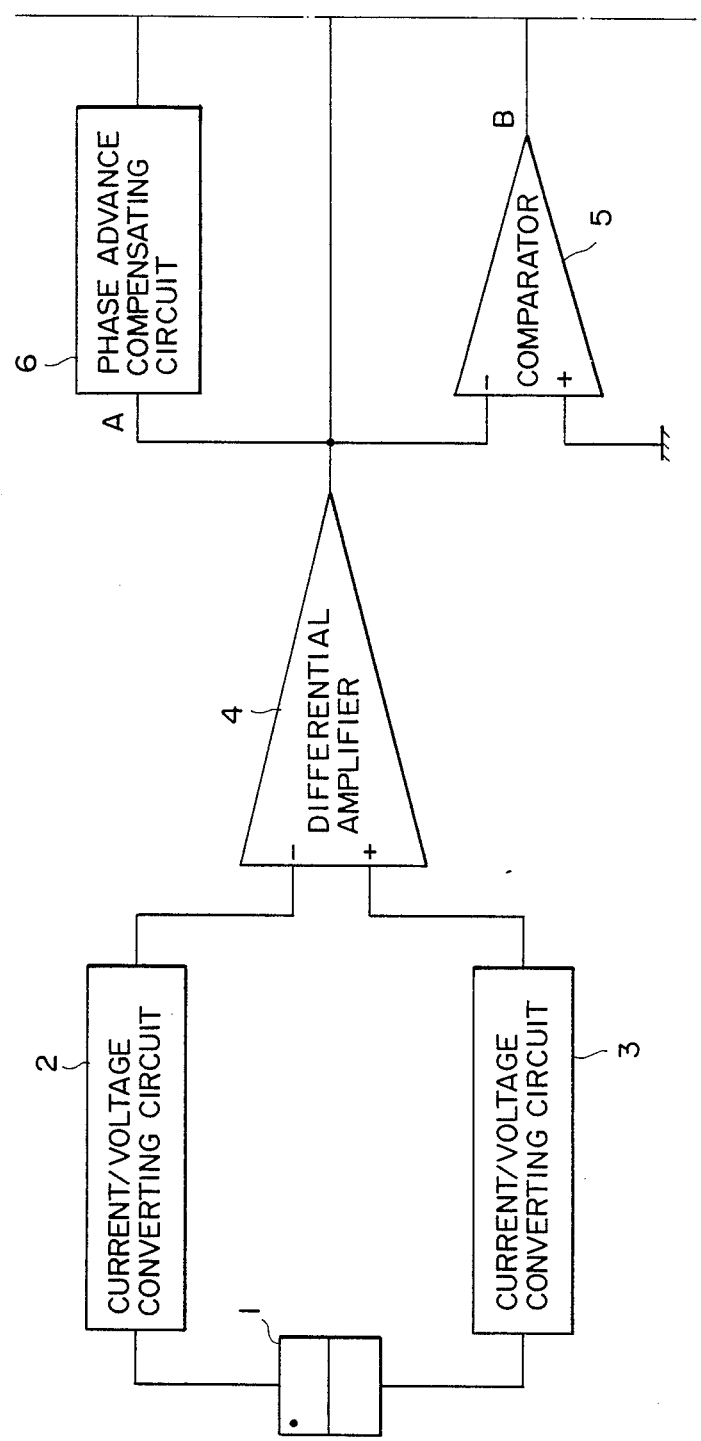

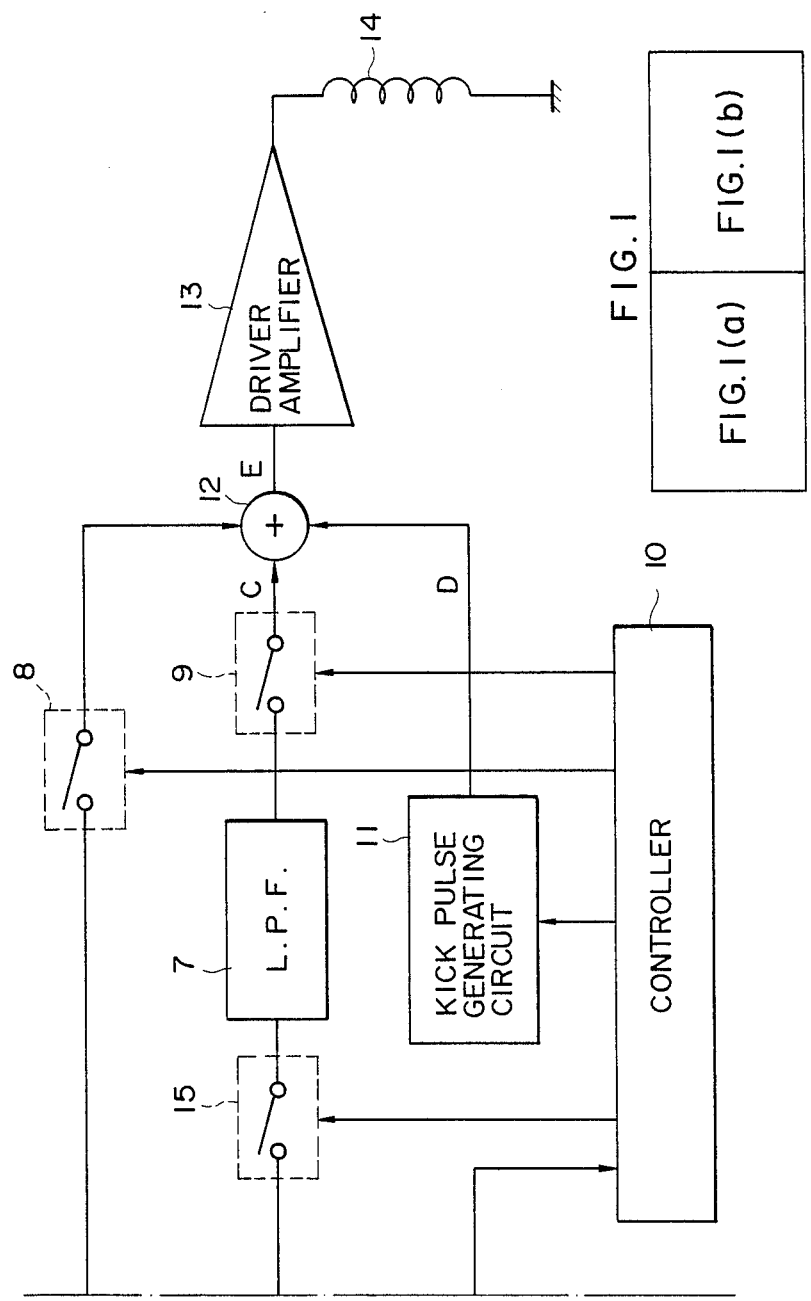

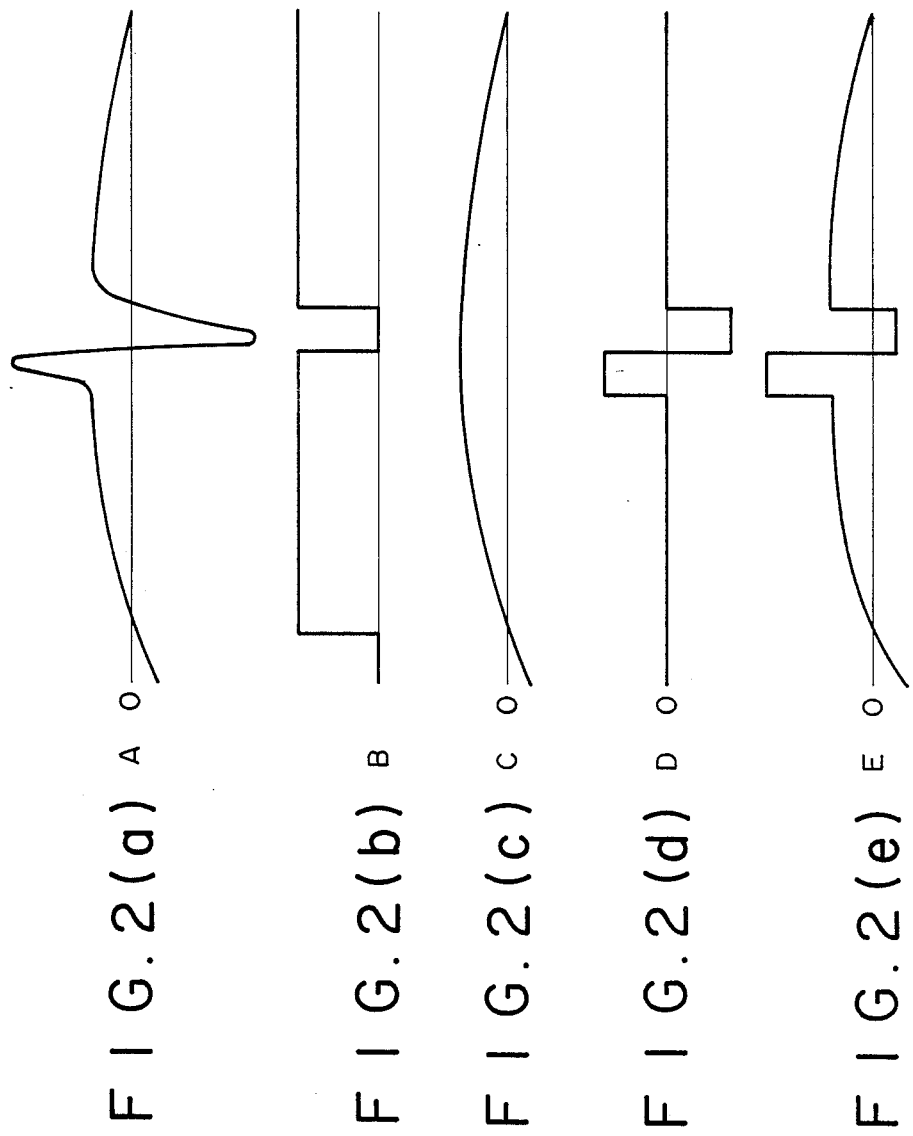

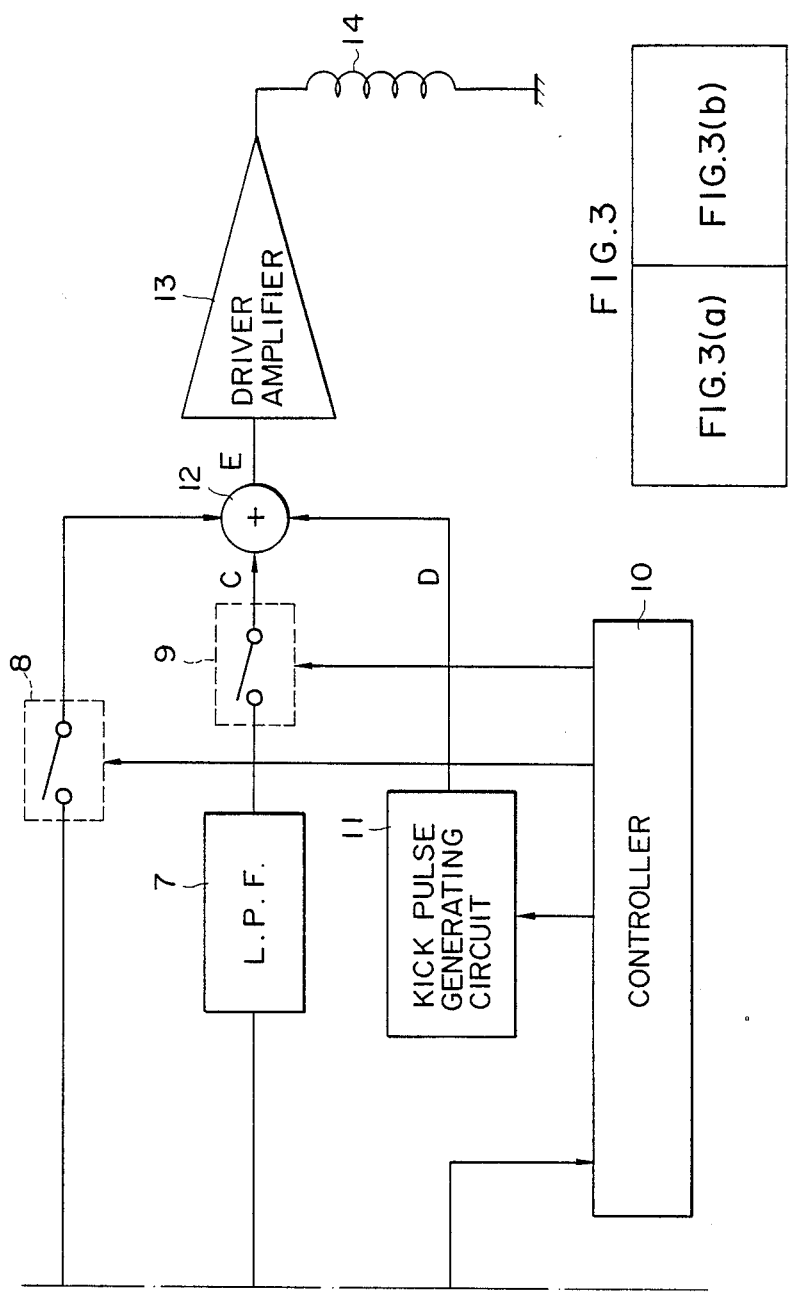

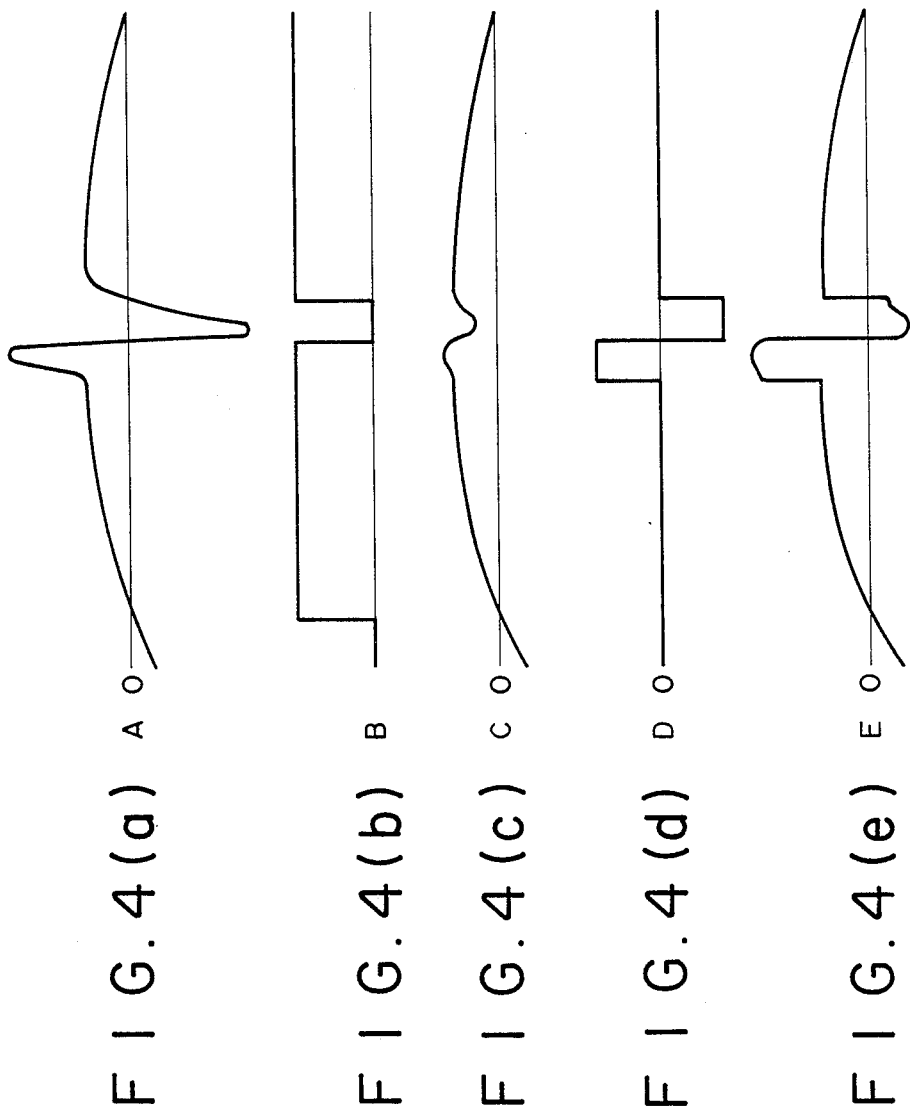

TRACKING CONTROL DEVICE OF AN OPTICAL PICK-UP

BACKGROUND OF THE INVENTION

1. Field of the Invention

This invention generally relates to an optical pick-up for use in an optical disk apparatus, and, in particular, to a tracking control device of such an optical pick-up.

2. Description of the Prior Art

In general, in an optical disk as an optical recording medium, various information is recorded on a surface by forming pits of approximately 1 micron in diameter at a pitch of approximately 2 microns on a recording track of the surface using a laser beam light spot. The recording track is defined in a pre-groove typically formed during manufacturing of an optical disk, and various information, such as identification information of a recording region and sync signal, necessary for proper management of recorded data is previously formed on the recording track. It is to be noted that such a recording track may be provided in plural number concentrically or singularly in a spiral format.

A laser beam is irradiated to the recording track of the optical disk and the light reflecting from the optical disk is picked up by an optical pick-up to thereby read the data recorded on the recording track. In such an optical disk apparatus, in order to read the information recorded on the recording track properly, it is required to position a light spot on the optical disk accurately. The proper positioning of a light spot on the optical disk can be attained by using a tracking control device. Such a tracking control device typically includes a phase compensation circuit for compensating the gain of a tracking servo loop. Typically, such a phase compensation circuit includes a delay phase compensation unit for compensating a control error (steady-state error) at a low frequency range and an advance compensation unit for securing stability of the tracking servo loop at intermediate and high frequency ranges.

In order to provide random accessibility in an optical disk apparatus, it is required for a light spot to jump from one track to another track radially of the optical disk. In accordance with the typical prior art method, such a track jump operation is carried out by turning the tracking servo loop off, then supplying a kick pulse for accelerating or decelerating a tracking actuator, and then turning the tracking servo loop on again. In such a prior art open-loop type pulse-driven track jump operation, it is susceptible to eccentricity of an optical disk and external disturbances, so that the positioning of the light spot after jumping tends to be unstable.

SUMMARY OF THE INVENTION

In accordance with the principle of the present invention, there is provided a tracking control device suitable for use in an optical disk apparatus, which comprises a pair of photoelectric elements for receiving light reflecting from an optical disk, a differential amplifier connected to receive outputs from the pair of photoelectric elements to produce a differential signal, and a phase compensation circuit comprised of a phase advance compensation circuit 6 and a low pass filter as a phase delay compensation circuit, which are connected in parallel. Preferably, the outputs of the phase advance and delay compensation circuits are connected to an adder through first and second switches, respectively. A comparator serving as a zero-cross detector is also provided for receiving the differential signal. Also provided is a pulse generator for supplying a bipolar drive pulse to the adder under the control of a controller which also controls the on/off state of each of the first and second switches. A resultant output obtained from the adder is supplied to a driver for driving a moving coil of a tracking actuator. In a normal tracking mode of operation, the pulse generator is held inoperative and the first and second switches are both turned on by the controller. On the other hand, in a track jump mode of operation, the pulse generator is rendered operative and the first switch is turned off while maintaining the second switch turned on by the controller.

In accordance with another aspect of the present invention, a third switch is provided as connected to the input terminal of the low pass filter. With this structure, in a normal tracking mode, the pulse generator is held inoperative and all of the first, second and third switches are turned on by the controller. On the other hand, in a track jump mode, the pulse generator is rendered operative and the first and second switches are turned off while keeping the second switch on by the controller.

It is therefore a primary object of the present invention to obviate the disadvantages of the prior art as described above and to provide an improved tracking control device suitable for use in an optical disk apparatus.

Another object of the present invention is to provide an improved tracking control device of an optical pick-up for use in an optical disc apparatus.

A further object of the present invention is to provide an improved tracking control device capable of controlling a normal tracking operation as well as a track jump operation.

A still further object of the present invention is to provide an improved tracking control device high in performance as well as in accuracy and stable and fast in operation.

Other objects, advantages and novel features of the present invention will become apparent from the following detailed description of the invention when considered in conjunction with the accompanying drawings.

BRIEF DESCRIPTION OF THE DRAWINGS

FIG. 1 is an illustration showing how to combine FIGS. 1(a) and 1(b);

FIGS. 1(a) and 1(b), when combined as illustrated in FIG. 1, define a schematic illustration showing a tracking control device of an optical disc system constructed in accordance with one embodiment of the present invention;

FIGS. 2(a) through 2(e) are waveforms which are useful for understanding the operation of the structure shown in FIGS. 1(a) and 1(b);

FIG. 3 is an illustration showing how to combine FIGS. 3(a) and 3(b);

FIGS. 3(a) and 3(b), when combined as illustrated in FIG. 3, define a schematic illustration showing a tracking control device of an optical disc system constructed in accordance with another embodiment of the present invention; and FIGS. 4(a) through 4(e) are waveforms which are useful for understanding the operation of the structure shown in FIGS. 3(a) and 3(b).

DESCRIPTION OF THE PREFERRED EMBODIMENTS

Figure 3A:
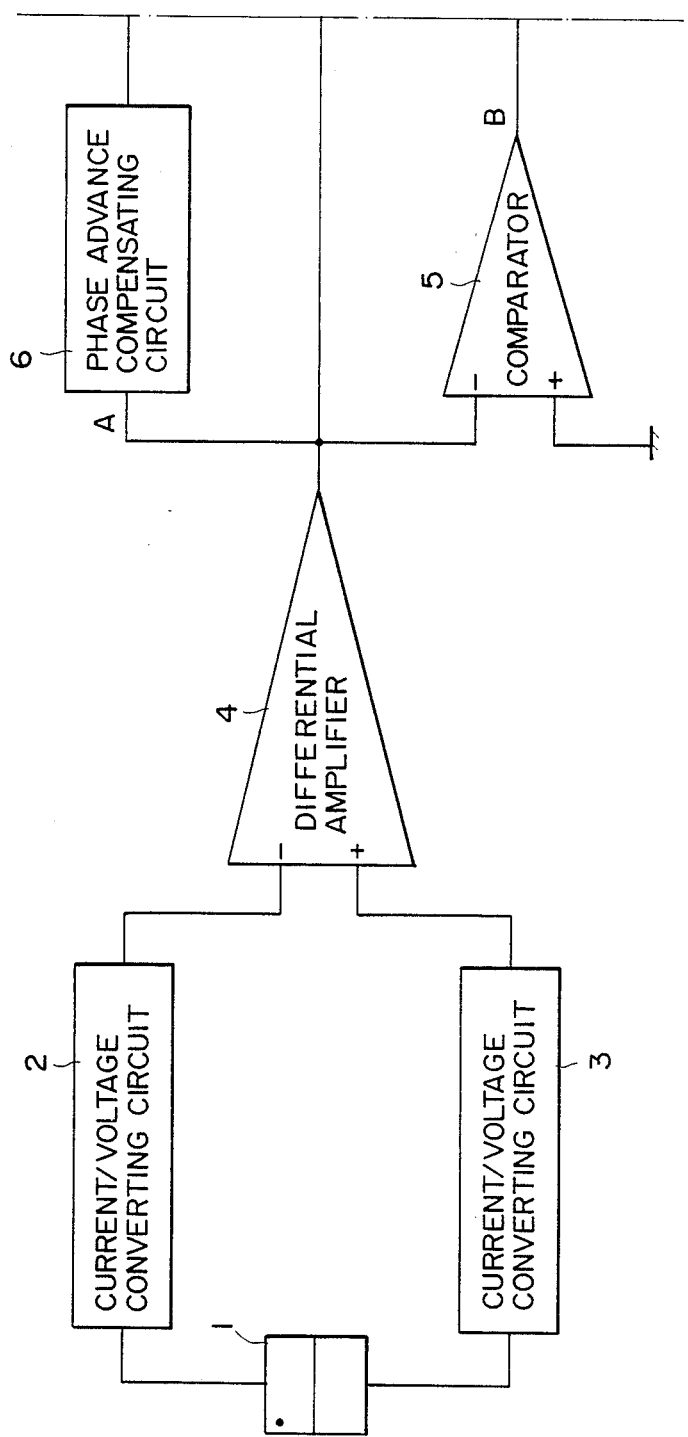

Referring now to FIGS. 3(a) and 3(b), there is schematically shown a tracking control system suitable for use in an optical disk apparatus constructed in accordance with one embodiment of the present invention. As shown, the tracking control system is typically incorporated in an optical pick-up and includes a photoelectric unit 1 for receiving light reflecting from an optical disk so as to detect an error in position of a light spot with respect to a recording track of the optical disk. For example, the photoelectric unit 1 is comprised of a pair of photoelectric elements so that it is provided with a pair of separate light-receiving surfaces for receiving the light reflecting from the optical disk. For this reason, the photoelectric unit 1 provides a pair of light current outputs which are supplied to respective current/voltage converting circuits 2 and 3, whereby the light current signals are converted into voltage signals. These two voltage signals are then supplied to a differential amplifier 4 which serves as a tracking error detecting circuit. As a result, a differential output from the differential amplifier 4 constitutes a tracking error signal A (see FIG. 4a). That is, since the amount of light of the light spot received by each of the pair of photoelectric elements of the photoelectric unit 2 differs from each other depending on the positional relationship between the light spot and a recording track of the optical disk, such a tracking error signal A can be obtained by processing these two light current outputs through the differential amplifier 4 after current-to-voltage conversion.

The tracking error signal A thus obtained is then supplied to a phase compensation circuit and also to a comparator 5. In the structure shown in FIGS. 3(a) and 3(b), the phase compensation circuit includes a phase advance compensation circuit 6 and a low pass filter 7 serving as a phase delay compensation circuit, which are connected in series. The output terminal of the phase advance compensation circuit 6 is connected to a first switch 8, and the output terminal of the low pass filter 7 is connected to a second switch 9. On the other hand, the comparator 5 is defined as a zero cross detecting comparator for detecting the fact that the tracking error signal A output from the differential amplifier 4 crosses zero level, and the comparator 5 outputs an output signal B as shown in FIG. 4(b) to a controller 10. A pulse generating circuit 11, or more specifically kick pulse generating circuit, is also connected to the controller 10. The pulse generating circuit 11 provides a bipolar drive pulse D (see FIG. 4(d)), which is a drive signal in a track jump control mode for moving a light spot on the surface of an optical disk in the radial direction, typically from one recording track to another recording track adjacent thereto radially. The reason why the drive pulse D is bipolar, i.e., having both of negative and positive components, is based on the fact that, in a track jump operation, acceleration is applied to the movement of a light spot by one of the positive and negative pulses and then deceleration is applied to the movement of the light spot by the other of the positive and negative pulses. The selection of the order of positive and negative pulses depends on whether a light spot moves inwardly or outwardly.

Then, an output from the phase advance compensation circuit 6, an output C from the low pass filter 7, and an output D from the pulse generating circuit 11 are all input to an adder 12 which outputs an added result as a drive signal E. This drive signal E is then supplied to a moving coil 14 of a tracking actuator of the optical pick-up through a driver amplifier 13. As a result, the optical pick-up is moved relative to the associated optical disk radially in accordance with the drive signal E to bring the optical pick-up in alignment with a recording track of the optical disk.

With the above-described structure, the on/off status of each of the first and second switches 8 and 9 is controlled by the controller 10. And, in a normal tracking mode of operation, the pulse generating circuit 11 is held inoperative, so that no output D is produced. In addition, both of the first and second switches 8 and 9 are rendered on by the controller 10. Under the condition, the tracking actuator, including the moving coil 14, is controlled using an added value of outputs from the phase advance compensation circuit 6 and the low pass filter 7 as a control signal. In this instance, a signal output from the phase advance compensation circuit 6 contributes to provide a driving force against intermediate and high frequency track shift and also to maintain stability in the servo system. On the other hand, the signal C output from the low pass filter 7 contributes to provide a driving force against a low frequency track shift due, for example, to external disturbances and eccentricity of the optical disk. Since both of the first and second switches 8 and 9 are normally closed, there is defined a tracking servo loop, so that the light spot on the optical disk can follow an information recording track of the optical disk properly.

On the other hand, in a track jump mode of operation, the pulse generating circuit 11 is activated by the controller 10 so that the track jump drive pulse D is output from the pulse generating circuit 11. In addition, the switch 8 is set open and the switch 9 is closed by the controller 10. Thus, while inhibiting output from the phase advance compensation circuit 6, the tracking actuator, including the moving coil 14, is controlled using the added result of the output C from the low pass filter 7 and the drive pulse D from the pulse generating circuit 11 as a control signal.

Described more specifically, while keeping the phase advance compensation circuit 6 inhibited from outputting, an acceleration pulse having a predetermined polarity (e.g., positive polarity if the light spot is to be moved outwardly) is output as the drive pulse D from the pulse generating circuit 11. Then, the moving coil 14 of a tracking actuator for moving the optical pick-up with respect to the associated optical disk is driven by this acceleration pulse, so that the optical pick-up moves radially outwardly to an adjacent recording track. It is to be noted that it may be so constructed to move the entire optical pick-up or any part thereof, such as an objective lens of the optical pick-up. As a result of this movement of the optical pick-up, the light spot moves on the optical disk radially outwardly to be located on the adjacent recording track. Accordingly, the light distribution on the two-part photoelectric unit 1 varies, so that the tracking error signal A changes from a maximum value of one polarity to another maximum value of the other polarity. And, the zero cross point during this change corresponds to the center of the recording track. At the timing of the occurrence of this zero cross point, the signal B is output from the comparator 5 and then supplied to the controller 10.

With the detection of such a zero cross point, the output signal B from the comparator 5 falls, and in synchronism with this falling edge, the controller 10 causes the pulse generating circuit 11 to switch the drive pulse D from the acceleration pulse to a deceleration pulse, which is opposite in polarity, e.g., negative polarity. As a result, the tracking actuator, including the moving coil 14, is decelerated to thereby cause the optical pick-up to be positioned above the adjacent recording track. Immediately after having the optical pick-up positioned above the adjacent recording track in this manner, the first switch 8 is turned on or closed by the controller 10 to thereby define the normal tracking servo loop.

Regarding an optical disk, it is typically driven with a radial misalignment due, for example, to an error in mounting to a drive shaft and eccentricity of the optical disk. For this reason, a recording track defined on the optical disk also has a radial misalignment in most cases. Such a radial misalignment causes a light spot to be shifted away from the recording track when the optical disk rotates; however, such a radial misalignment can be absorbed by providing a tracking servo loop which keeps a light spot to be properly positioned with respect to a recording track. However, in a track jump mode which is susceptible to radial misalignment of a recording track, if the track jump control is to be carried out in an open loop format, i.e., with both of the first and second switches 8 and 9 being off or open in the structure of FIGS. 3(a) and (b), the drive signal output from the adder 12 would have a shape as shown in FIG. 4(d), which does not include error correction components (i.e., components for compensating for the radial misalignment of a recording track) in the drive signal as different from the drive signal shown in FIG. 4(e). Thus, in an open loop mode, the positioning error becomes larger.

On the other hand, in accordance with the structure shown in FIGS. 3(a) and 3(b), the radial misalignment of a recording track can be properly compensated for or absorbed to thereby allow to position the light spot in alignment with the adjacent recording track after track jump. That is, in accordance with the present embodiment, during the track jump mode, the first switch 8 is turned off or set open and the second switch 9 is turned on or closed by the controller 10. Under this condition, during the track jump mode, the drive signal from the pulse generating circuit 11 is added with the output C from the low pass filter 7 by the adder 12 and the resulting drive signal E is applied to the moving coil 14 of the tracking actuator. In this manner, during the track jump mode, the information regarding the radial misalignment of a recording track, which is a low frequency component of the differential signal A, is included in the drive signal E as shown in FIG. 4(e), so that the radial misalignment of a recording track can be suitably corrected, thereby allowing to carry out a track jump operation securely.

However, even in the above-described embodiment, there appears a track error signal, e.g., a leakage signal as indicated by a dip in signal C of FIG. 4(a), when crossing a recording track, though it is relatively small. As a result, such a track error signal can still cause instability in a track jump operation. A second embodiment of the present invention is directed to correct such a track error signal to further improve the track jump operation.

FIGS. 1(a) and 1(b) illustrate a tracking control system constructed in accordance with another embodiment of the present invention. It is to be noted that the embodiment shown in FIGS. 1(a) and 1(b) is structurally similar in many respects to the embodiment shown in FIGS. 3(a) and 3(b), so that like elements are indicated by like numerals. The present embodiment shown in FIGS. 1(a) and 1(b) differs in structure from the previous embodiment shown in FIGS. 3(a) and 3(b) in that a third switch 15 is additionally provided between the differential amplifier 4 and the low pass filter 7. The on/off status of the third switch 15 is controlled by the controller 10, and the third switch 15 is normally kept on or closed. During the track jump mode, the third switch 15 is turned off or set open by the controller 10.

Described more in detail, during the track jump mode, under the control of the controller 10, the first and third switches 8 and 15 are kept off and the second switch 9 is kept on. That is, outputting from the phase advance compensation circuit 6 is inhibited, and while the input side of the low pass filter 7 set open or disconnected, the output C of the low pass filter 7 and the drive pulse D output from the pulse generating circuit 11 are added at the adder 12, and the resulting drive signal E is applied to the moving coil 14 of the tracking actuator as a feedback control signal. As a result, a leakage signal from the low pass filter 7 at the time of crossing a recording track is eliminated. In addition, since the low pass filter 7 is capable of holding the voltage immediately prior to the track jump, compensation for the radial misalingnment of a recording track, which constitutes the low frequency component of the differential signal A, can be carried out. Thus, in accordance with the present embodiment, without providing an extra voltage holding circuit, the low pass filter 7 is also used as a holding circuit for holding the voltage immediately prior to track jump to provide compensation for the low frequency component of the differential signal A. The voltage held by the low pass filter 7 decreases in accordance with a time constant of the low pass filter 7; however, since the track jump processing time period is extremely short and an error in the holding voltage is extremely small, the voltage held by the low pass filter 7 may be considered to be sufficiently smooth and substantially at constant during a track jump operation, as shown in FIG. 2(c).

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A tracking control system for tracking a recording track of an optical disk in an optical disk apparatus, comprising:

detecting means for detecting light reflecting from an optical disk, said detecting means including a pair of light-receiving surfaces for producing a pair of light output signals;

producing means for producing a differential signal from said pair of light output signals;

first compensating means responsive to said differential signal for compensating a first frequency component of said differential signal to produce a first signal;

second compensating means responsive to said differential signal for compensating a second frequency component, which is different from said first frequency component, of said differential signal to produce a second signal;

zero cross detecting means for detecting a zero cross point of said differential signal to provide a zero cross detection signal;

pulse generating means for generating a pulse;

summing means for summing said first and second signals and said pulse to provide a drive signal for driving a tracking actuator;

a first switch connected between said first compensating means and said summing means;

a second switch connected between said second compensating means and said summing means; and controlling means responsive to said zero cross detection signal for controlling said pulse generating means to generate a pulse, said controlling means also controlling an on/off status of each of said first and second switches.

2. The system of claim 1 wherein both of said first and second switches are rendered on and said pulse generating means is held inoperative by said controlling means in a normal tracking mode operation and said first switch is rendered off and said second switch is rendered on by said controlling means in a track jump mode of operation.

3. The system of claim 2 wherein said first frequency component includes intermediate and high frequency components of said differential signal and said second frequency component includes a low frequency component of said differential signal.

4. The system of claim 3 wherein said second compensating means includes a low pass filter.

5. The system of claim 2 further comprising a third switch connected between said producing means and said second compensating means, an on/off status of said third switch being controlled by said controlling means.

6. The system of claim 5 wherein said third switch is rendered on in a normal tracking mode of operation and rendered off in a track jump mode of operation.

7. The system of claim 6 wherein said first frequency component includes intermediate and high frequency components of said differential signal and said second frequency component includes a low frequency component of said differential signal.

8. The system of claim 7 wherein said second compensating means includes a low pass filter which also serves as a holding circuit for holding a voltage immediately prior to track jump.

* * * * *